US008259388B2

(12) United States Patent
Miyauchi

(10) Patent No.: US 8,259,388 B2
(45) Date of Patent: Sep. 4, 2012

(54) OPTICAL FIBER AMPLIFIER

(75) Inventor: Hidenori Miyauchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/176,939

(22) Filed: Jul. 6, 2011

(65) Prior Publication Data

US 2011/0279891 A1 Nov. 17, 2011

Related U.S. Application Data

(63) Continuation of application No. PCT/JP2010/050013, filed on Jan. 5, 2010.

(30) Foreign Application Priority Data

Jan. 7, 2009 (JP) ................................ 2009-001777

(51) Int. Cl.
*H01S 3/02* (2006.01)
*H04B 10/17* (2006.01)

(52) U.S. Cl. ........................................ 359/337; 372/34

(58) Field of Classification Search .................. 359/337; 372/34

See application file for complete search history.

(56) References Cited

U.S. PATENT DOCUMENTS 4,905,247 A * 2/1990 Glessner et al. ................ 372/55
6,104,526 A * 8/2000 Kakui ........................... 359/337
6,278,719 B1 * 8/2001 Ohishi et al. ...................... 372/6
6,366,395 B1 * 4/2002 Drake et al. ............. 359/341.41
7,039,086 B2 * 5/2006 Fallon et al. .................... 372/55
7,400,444 B2 * 7/2008 Shukunami et al. ..... 359/341.41
7,733,927 B2 * 6/2010 Furuya et al. ................... 372/21
2001/0040720 A1 * 11/2001 Gerrish et al. ............. 359/341.4
2006/0120418 A1 * 6/2006 Harter et al. .................... 372/30
2008/0013574 A1 * 1/2008 Furuya et al. ..................... 372/6

(Continued)

FOREIGN PATENT DOCUMENTS

JP 05-167144 A 7/1993

OTHER PUBLICATIONS

Bertrand Morasse et al., "10w ASE-free single-mode high-power double-cladding Er3+—Yb3+ amplifier", Proceedings of SPIE, 2007, vol. 6453, pp. 645324-1-645324-8.

(Continued)

*Primary Examiner* — Isam Alsomiri
*Assistant Examiner* — Ari M Diacou
(74) *Attorney, Agent, or Firm* — Westerman, Hattori, Daniels & Adrian, LLP

(57) ABSTRACT

An object of the present invention is to provide an optical fiber amplifier capable of suppressing oscillation of ASE. The optical fiber amplifier includes a second amplifier fiber 30 doped with a rare earth element; a second pumping source 26 that supplies pump light to the second amplifier fiber 30; a storage unit 40 for storing a relationship between oscillation threshold pump power and temperature of the second amplifier fiber 30, the oscillation threshold pump power being power of the pump light which causes oscillation of ASE in a different wavelength range from a signal wavelength range produced by the second amplifier fiber 30; and a temperature controller 38 for controlling the temperature of the second amplifier fiber 30 so that the oscillation threshold pump power is higher than the power of the pump light outputted by the second pumping source 26, by referring to the relationship stored in the storage unit 40.

4 Claims, 5 Drawing Sheets

INPUT SIGNAL LIGHT
OUTPUT SIGNAL LIGHT
12 14 16 18 20 22 24 25 26 28 30 32 34 36 38 40 42
10

U.S. PATENT DOCUMENTS

2008/0144674 A1* 6/2008 Park et al. ......................... 372/6

OTHER PUBLICATIONS

Qiang Wang et al., "Er-Yb double-clad fiber amplifier", Optical Engineering, 2004, vol. 43, No. 5, pp. 1030-1034.

L. Luo et al., "Strong near-infrared photoluminescence in erbium/ytterbium codoped porous silicon", Applied Physics Letters, 2005, vol. 86, pp. 212505-1-212505-3.

International Search Report for PCT/JP2010/050013, mailing date of Feb. 2, 2010.

* cited by examiner

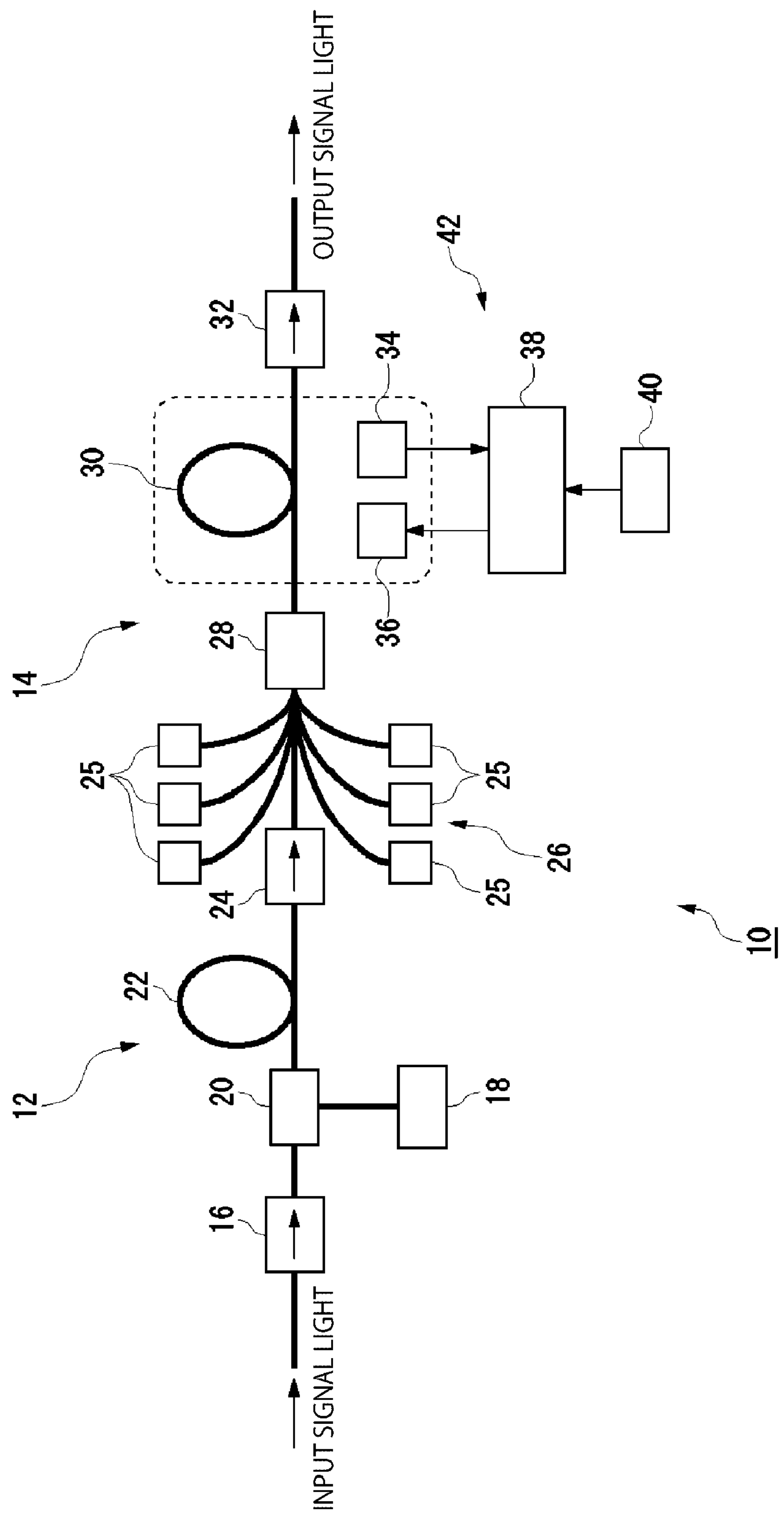
[FIG. 1]

[FIG. 2]
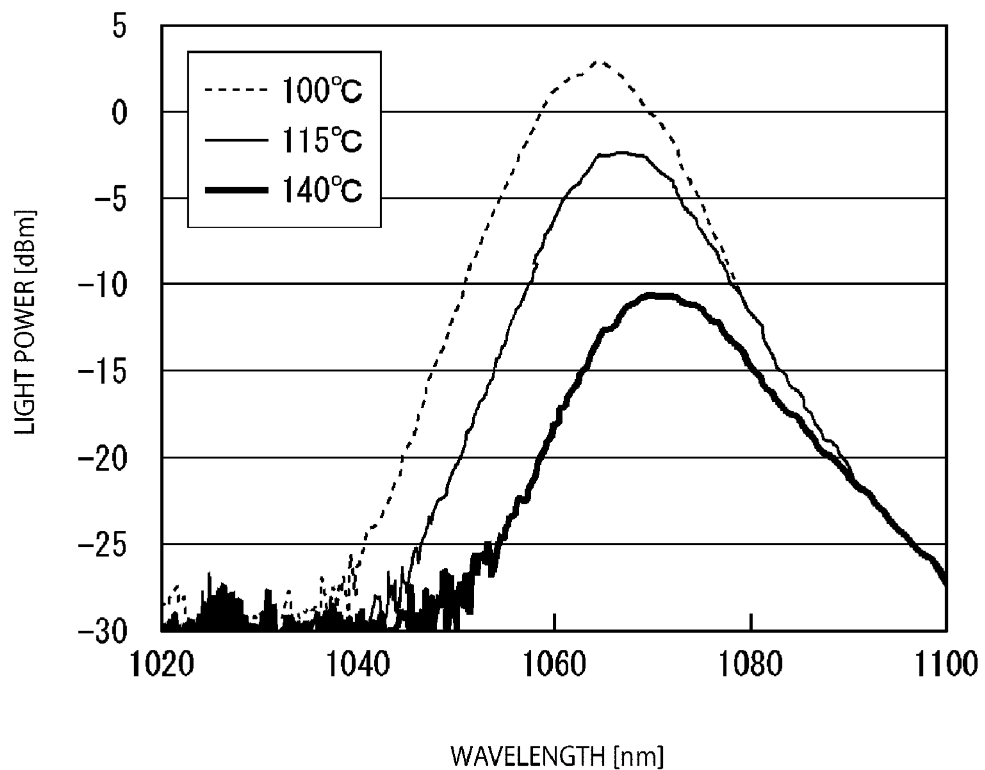
[FIG. 3]
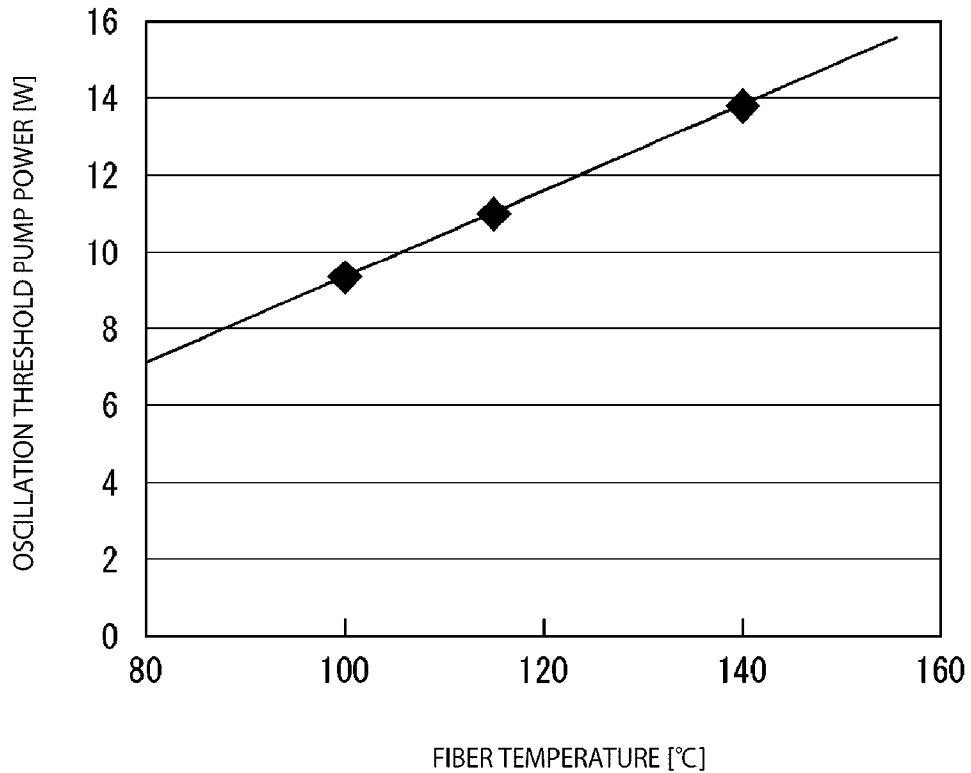

[FIG. 4]
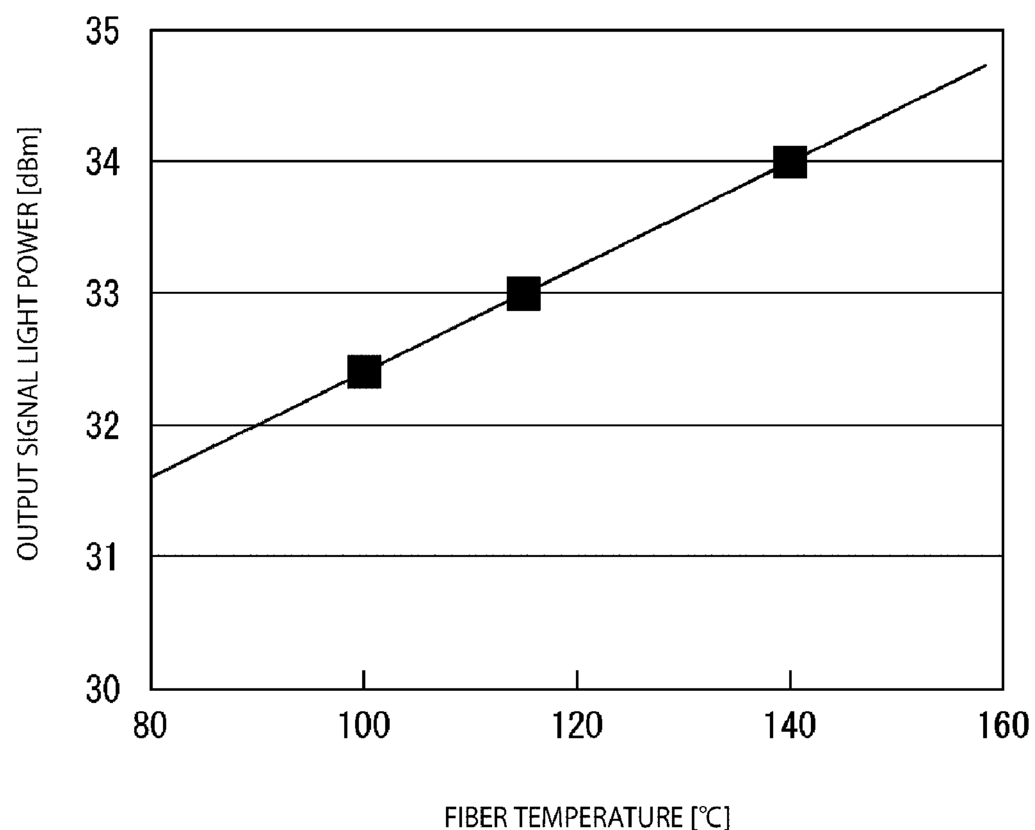

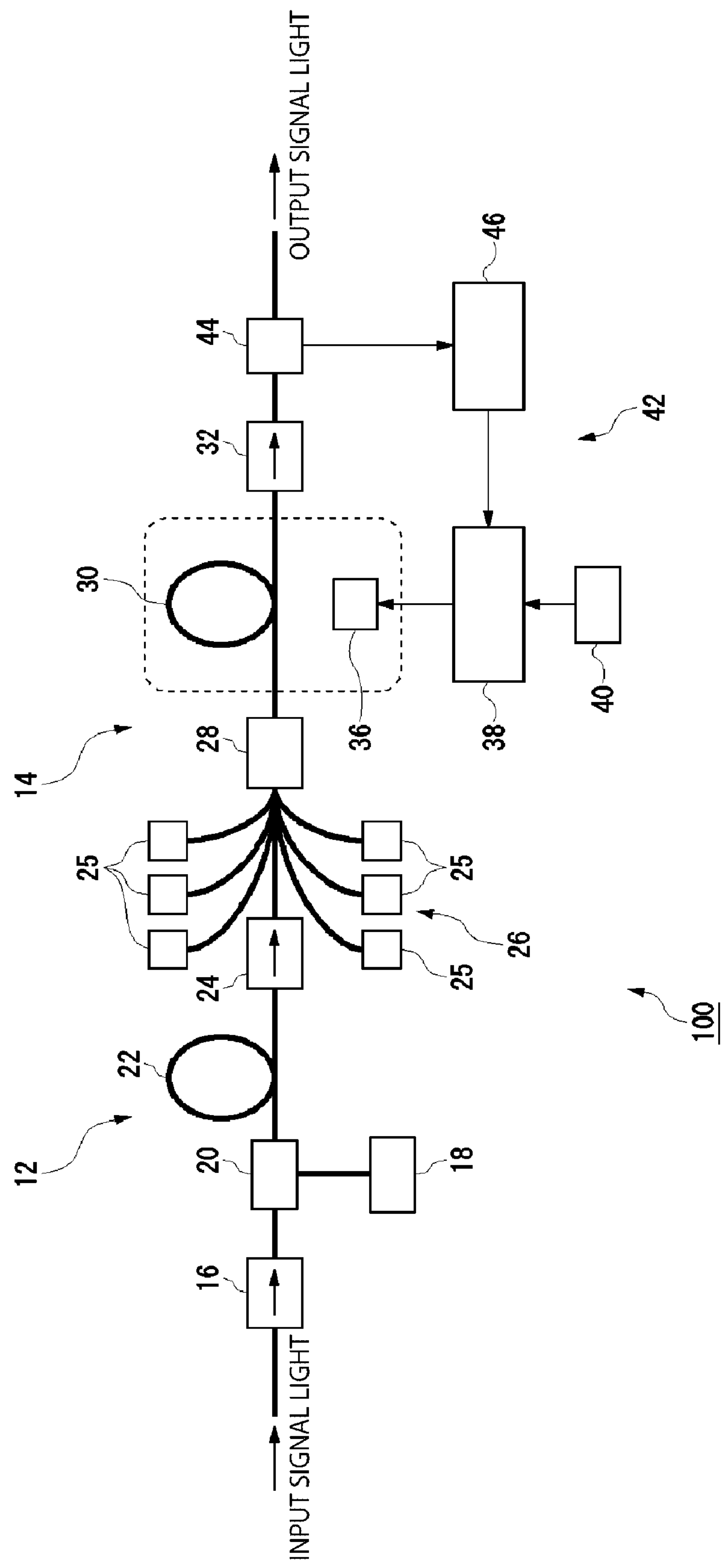
[FIG. 5]

[FIG. 6]
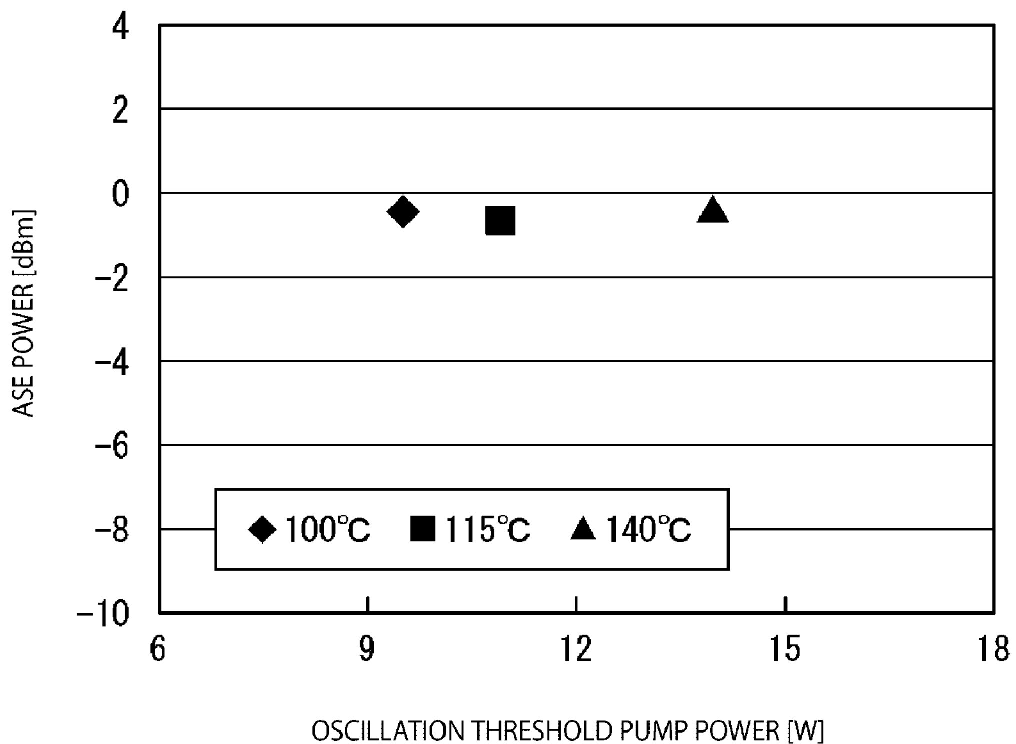
[FIG. 7]
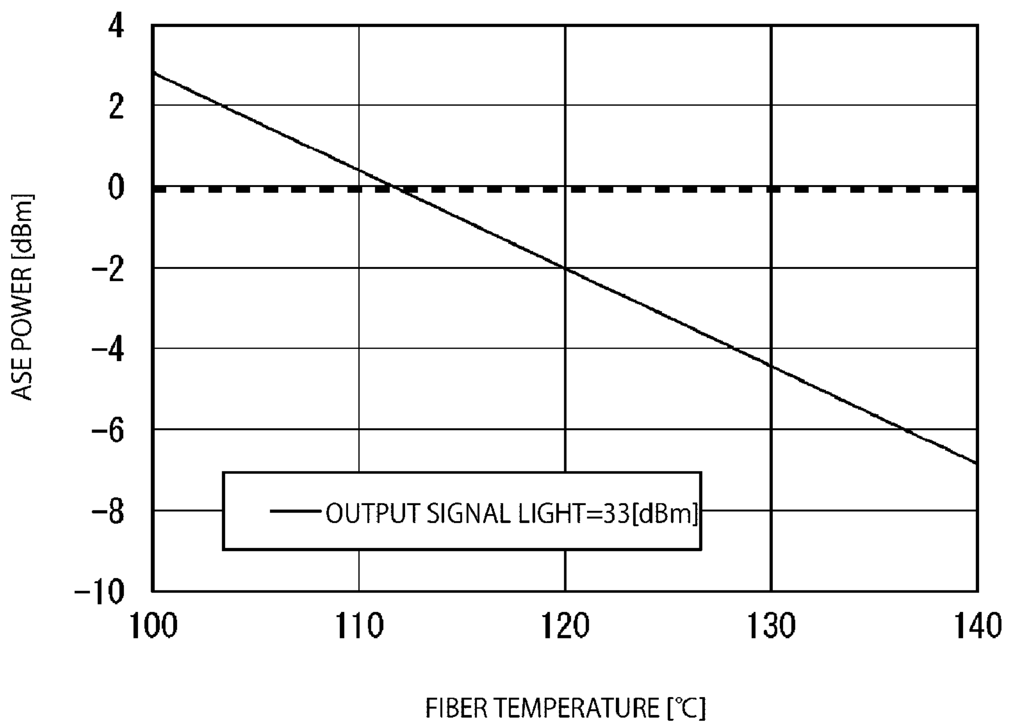

OPTICAL FIBER AMPLIFIER

TECHNICAL FIELD

The present invention relates to an optical fiber amplifier using an amplifier optical fiber doped with a rare earth element.

BACKGROUND ART

An optical fiber amplifier using an amplifier optical fiber doped with a rare earth element such as Er (erbium) can be expected to achieve high gain but produces an increased amount of ASE (Amplified Spontaneous Emission), which may oscillate by reflection or scattering (Rayleigh scattering) of light. This oscillation is unstable, and the occurrence of the oscillation can cause instantaneous strong light to destroy a pumping source or an optical component. The avoidance of the oscillation requires that the power of pump light be lower than that during the oscillation, thus leading to the limited power of output signal light, and accordingly, desired output power may not be satisfied. Therefore, there is a demand for an optical fiber amplifier in which the oscillation is suppressed.

A conventional optical amplifier designed in consideration for suppression of the oscillation generally uses an isolator. For example, in Patent Document 1, the oscillation by the reflection is prevented over a wide range of temperatures, and also, a filter is used to prevent the oscillation by end reflection at the pumping source.

PRIOR ART DOCUMENT

Patent Document

Patent Document 1: Japanese Patent Application Publication No. Hei 5-167144

SUMMARY OF THE INVENTION

Object to be Solved by the Invention

The use of an Er—Yb-co-doped fiber (EYDF) co-doped with Er and Yb (ytterbium) has been recently considered as an amplifier optical fiber. The EYDF utilizes the transfer of energy from excitation level of Yb thereby to form a population inversion between levels of Er, and amplifies signal light by stimulated emission therefrom.

In an optical fiber amplifier using such an EYDF, ASE in a 1060 nm wavelength range is produced. Suppression of oscillation of the ASE in the 1060 nm range requires that the power of pump light be set low, and accordingly, desired output power may not be achieved.

Also, for the suppression of the oscillation of the ASE in the 1060 nm range, a method may be adopted in which an isolator for the 1060 nm range is used in an optical amplifier. In this instance, the isolator for the 1060 nm range is required to be compatible with a double-clad fiber, have sufficient resistance to power, and adequately transmit an excitation wavelength (for example, 915 nm). The fabrication of such an isolator for the 1060 nm range is however very difficult with the current technology, or results in very high cost even if feasible. Therefore, the method in which the isolator for the 1060 nm range is used in the optical amplifier is not practical.

The present invention has been made in consideration for the foregoing problems. An object of the present invention is to provide an optical fiber amplifier capable of appropriately suppressing the oscillation of the ASE.

Means for Solving the Object

To solve the object, an optical fiber amplifier of an aspect of the present invention includes: an amplifier optical fiber doped with a rare earth element; a pumping source that supplies pump light to the amplifier optical fiber; storage means for storing a relationship between oscillation threshold pump power and a temperature of the amplifier optical fiber, the oscillation threshold pump power being power of the pump light which causes oscillation of ASE in a different wavelength range from a signal wavelength range produced by the amplifier optical fiber; and temperature control means for controlling the temperature of the amplifier optical fiber so that the oscillation threshold pump power is higher than the power of the pump light outputted by the pumping source, by referring to the relationship stored in the storage means.

According to this aspect, suppression of the oscillation of the ASE in the different wavelength range from the signal wavelength range can be accomplished by controlling the temperature of the amplifier optical fiber so that the oscillation threshold pump power is higher than the power of the pump light outputted by the pumping source. Thereby, the power of the pump light can be set high, and thus, power of output signal light can be increased.

Another aspect of the present invention also pertains to an optical fiber amplifier. This optical fiber amplifier includes: an amplifier optical fiber doped with a rare earth element; a pumping source that supplies pump light to the amplifier optical fiber; detecting means for detecting power of ASE in a different wavelength range from a signal wavelength range produced by the amplifier optical fiber; storage means for storing oscillation threshold ASE power and a relationship between the power of the ASE detected by the detecting means and temperature of the amplifier optical fiber, the oscillation threshold ASE power being the power of the ASE which causes oscillation of the ASE; and control means for controlling the temperature of the amplifier optical fiber so that the power of the ASE detected by the detecting means is equal to or lower than the oscillation threshold ASE power, by referring to the oscillation threshold ASE power and the relationship stored in the storage means.

According to this aspect, suppression of the oscillation of the ASE in the different wavelength range from the signal wavelength range can be accomplished by controlling the temperature of the amplifier optical fiber so that the power of the ASE detected by the detecting means is equal to or lower than the oscillation threshold ASE power. Thereby, the power of the pump light can be set high, and thus, power of output signal light can be increased.

The amplifier optical fiber may be co-doped with any two selected from the group consisting of Er, Nd, Ho, Tm, Pr, Yb and Eu. The amplifier optical fiber may be a double-clad optical fiber. The present invention is especially effective for an optical fiber amplifier using such an amplifier optical fiber.

Effect of the Invention

According to the present invention, the optical fiber amplifier capable of appropriately suppressing of the oscillation of the ASE can be provided.

BRIEF DESCRIPTION OF THE DRAWINGS

FIG. 1 is a diagram showing an optical fiber amplifier according to a first embodiment of the present invention.

FIG. 2 is a graph showing a spectrum of ASE in a 1060 nm wavelength range.

FIG. 3 is a graph showing a relationship between oscillation threshold pump power and temperature of a second amplifier fiber.

FIG. 4 is a graph showing a relationship between the power of output signal light of the optical fiber amplifier and the temperature of the second amplifier fiber, as observed when the power of second pump light is equal to the oscillation threshold pump power.

FIG. 5 is a diagram showing an optical fiber amplifier according to a second embodiment of the present invention.

FIG. 6 is a graph showing a relationship between the oscillation threshold pump power and the power of the ASE.

FIG. 7 is a graph showing a relationship between the power of the ASE detected by an ASE monitor unit and the temperature of the second amplifier fiber.

BEST MODE FOR CARRYING OUT THE INVENTION (First Embodiment)

FIG. 1 is a diagram showing an optical fiber amplifier 10 according to a first embodiment of the present invention. As shown in FIG. 1, an optical fiber amplifier 10 includes a first amplifier 12 and a second amplifier 14.

The first amplifier 12 includes an Er (erbium)-doped, single-cladding, first amplifier fiber 22, a first pumping source 18 that supplies first pump light to the first amplifier fiber 22, a multiplexer 20 for multiplexing input signal light and the first pump light, and a first isolator 16 and a second isolator 24 for preventing laser oscillation by reflection. In the embodiment, the input signal light has a wavelength of 1550 nm, and the first pump light outputted by the first pumping source 18 has a wavelength of 980 nm. Also, the first isolator 16 and the second isolator 24 are the isolators configured to achieve the optimum isolation for light in a 1550 nm wavelength range. Here, the isolation means that light with a predetermined wavelength is allowed to pass through the isolator from the entry side to the exit side, while on the other hand, the light is not allowed to pass therethrough from the exit side to the entry side. The first isolator 16 and the second isolator 24 are each, for example, an optical system in which a Faraday rotator that rotates a plane of polarization by 45° is sandwiched between two polarizers whose transmission axes are offset by 45° from each other.

In the first amplifier 12, the input signal light is inputted through the first isolator 16 to the multiplexer 20. The signal light is multiplexed with the first pump light by the multiplexer 20, and is inputted to the first amplifier fiber 22. The first amplifier fiber 22 is excited by the first pump light, and amplifies the signal light by stimulated emission. In the first amplifier 12, ASE in the 1550 nm wavelength range is produced in the first amplifier fiber 22; however, oscillation of the ASE is suppressed by the first isolator 16 and the second isolator 24.

The second amplifier 14 includes a second amplifier fiber 30, a second pumping source 26, a pump combiner 28, a third isolator 32, and an oscillation suppressor 42.

The second amplifier fiber 30 is a double-clad fiber co-doped with Er (erbium) and Yb (ytterbium). The second amplifier fiber 30 has a core through which the signal light propagates, a first cladding that coats the periphery of the core and effects multi-mode propagation of the pump light, and a second cladding that coats the periphery of the first cladding.

The second pumping source 26 is made up of six multi-mode pumping source elements 25, and multi-mode light outputted by each pumping source element 25 is combined into high-power second pump light by the pump combiner 28. In the embodiment, the second pump light outputted by the second pumping source 26 has a wavelength of 915 nm. The third isolator 32 is the isolator configured to achieve the optimum isolation for the light in the 1550 nm range.

In the second amplifier 14, the signal light outputted by the second isolator 24 of the first amplifier 12 is combined with the second pump light by the pump combiner 28, and is inputted to the second amplifier fiber 30. The second pump light entered into the first cladding of the second amplifier fiber 30 undergoes the multi-mode propagation through the first cladding, and, in the process of the propagation, the mode passing through the core effects excitation of a rare earth element with which the core is doped. Then, the signal light propagating through the core is amplified by the stimulated emission. The signal light amplified by the second amplifier fiber 30 passes through the third isolator 32, and exits as output signal light from the optical fiber amplifier 10. In the second amplifier 14, a multi-mode light source may be utilized as the pumping source, and thus, a high-power optical amplifier can be configured.

Here, in the second amplifier 14, the double-clad fiber co-doped with Er and Yb is used as the second amplifier fiber 30, and thus, the ASE is produced in the 1550 nm wavelength range as a signal wavelength range, and in a 1060 nm wavelength range as a different wavelength range from the signal wavelength range. The oscillation of the ASE in the 1550 nm wavelength range can be suppressed by the second isolator 24 and the third isolator 32. However, as for the ASE in the 1060 nm wavelength range, suppression of the oscillation is not possible with the second isolator 24 and the third isolator 32 as the isolators for the 1550 nm range, and the oscillation occurs in the vicinity of a wavelength at which the ASE reaches maximum gain, which, in turn, can possibly cause instantaneous strong light to enter each pumping source element 25 and destroy each pumping source element 25. Thus, the power of the second pump light outputted by the second pumping source 26 has to be set to a smaller value than the value at the time of the oscillation, and a desired signal output may not be achieved.

Also, an isolator for the 1060 nm range may be interposed between the pump combiner 28 and the second amplifier fiber 30 or between the pumping source elements 25 and the pump combiner 28 thereby to protect the pumping source elements 25. As mentioned above, the fabrication of the isolator for the 1060 nm range is however very difficult with the current technique, or results in very high cost even if feasible, and therefore, the use of the isolator for the 1060 nm range is not practical.

Therefore, the inventor has studied diligently for the suppression of the oscillation of the ASE in the 1060 nm wavelength range, and found out that the ASE in the 1060 nm wavelength range has temperature dependence. FIG. 2 shows a spectrum of the ASE in the 1060 nm wavelength range. In FIG. 2, there is shown the spectra as observed when the temperature of the second amplifier fiber 30 is 100° C., 115° C., and 140° C. From FIG. 2, it can be seen that rise in the temperature of the second amplifier fiber 30 leads to a reduction in the power of the ASE. The inventor has came up with the present invention by finding out that, as shown in FIG. 2, the temperature dependence of the ASE in the 1060 nm wavelength range can be utilized for the suppression of the oscillation of the ASE.

Hereinafter, description will be given with regard to a configuration for the suppression of the ASE as employed in the embodiment. In the embodiment, the oscillation suppressor 42 is provided for appropriate suppression of the oscillation of the ASE in the 1060 nm wavelength range. The oscillation suppressor 42 includes a temperature detector 34, a temperature varying unit 36, a temperature controller 38, and a storage unit 40. Functional blocks such as the temperature controller 38 and the storage unit 40 shown in FIG. 1 may be implemented in hardware by means of elements or mechanical devices including CPU and memory of a computer and be implemented in software by means of computer programs or the like. Here, the functional blocks are depicted as being implemented by combination of hardware and software. Therefore, it is to be understood by those skilled in the art that these functional blocks may be implemented in various forms by combinations of hardware and software.

The temperature detector 34 directly or indirectly detects the temperature of the second amplifier fiber 30. The temperature detector 34 may be a thermistor, a thermocouple, or the like, which detects the temperature in direct contact with the second amplifier fiber 30. Alternatively, the temperature detector 34 may estimate the temperature of the second amplifier fiber 30 from temperature of a component around the second amplifier fiber 30 or ambient temperature of the inside of a housing in which the second amplifier fiber 30 is accommodated, without direct contact with the second amplifier fiber 30. Temperature information on the second amplifier fiber 30 detected by the temperature detector 34 is sent to the temperature controller 38.

The temperature varying unit 36 heats the second amplifier fiber 30 to change the temperature of the second amplifier fiber 30, based on a control signal from the temperature controller 38. The temperature varying unit 36 can be formed for example by sandwiching the second amplifier fiber 30 wound in the form of a coil between polyimide heaters.

The storage unit 40 prestores a relationship between the power of the pump light which causes the oscillation of the ASE in a 1060 nm wavelength range by the second amplifier fiber 30 (hereinafter referred to as oscillation threshold pump power) and the temperature of the second amplifier fiber 30. FIG. 3 is a graph showing a relationship between oscillation threshold pump power and temperature of the second amplifier fiber 30. In FIG. 3, the horizontal axis indicates the temperature of the second amplifier fiber 30, and the vertical axis indicates the oscillation threshold pump power. As shown in FIG. 3, as the temperature of the second amplifier fiber 30 rises, the oscillation threshold pump power also increases. In other words, the oscillation threshold pump power can be changed by changing the temperature of the second amplifier fiber 30. The suppression of the oscillation of the ASE in the 1060 nm wavelength range can be accomplished by controlling the temperature of the second amplifier fiber 30 according to the desired power of the pump light.

It is desirable that the relationship between the oscillation threshold pump power and the temperature of the second amplifier fiber 30 be measured in advance for each optical fiber amplifier 10. This allows the relationship between the oscillation threshold pump power and the temperature of the second amplifier fiber 30 to be accurately set. This relationship depends on a fiber length of the second amplifier fiber 30, and thus, the above-mentioned relationship of the fiber of a length for actual use may be calculated for example based on measured data of fibers of plural lengths as the reference, and be stored in advance in the storage unit 40. In this case, a measurement process can be omitted, and thus, manufacturing cost can be reduced.

The temperature controller 38 acquires the temperature information from the temperature detector 34, and controls the temperature of the second amplifier fiber 30 so that the oscillation threshold pump power is higher than the power of the second pump light outputted by the second pumping source 26, by referring to the relationship between the oscillation threshold pump power and the temperature of the second amplifier fiber 30 stored in the storage unit 40. For example, if the temperature of the second amplifier fiber 30 is 100° C. when the power of the second pump light to be set is 10 W, the temperature controller 38 performs controls so that the temperature of the second amplifier fiber 30 is higher than about 108° C., by referring to the relationship between the oscillation threshold pump power and the temperature of the second amplifier fiber 30 shown in FIG. 3. Thereby, the oscillation threshold pump power becomes higher than 10 W as the desired power of the second pump light, and thus, the oscillation of the ASE in the 1060 nm wavelength range can be suppressed.

FIG. 4 shows a relationship between the power of output signal light of the optical fiber amplifier 10 and the temperature of the second amplifier fiber 30, as observed when the power of the second pump light is equal to the oscillation threshold pump power. As the temperature of the second amplifier fiber 30 rises, the oscillation threshold pump power increases, and thus, the power of the second pump light can be set high, and higher output signal light power can be achieved.

In the embodiment, higher temperature of the second amplifier fiber 30 can yield higher oscillation threshold pump power. However, when the oscillation threshold pump power is higher than the desired power of the second pump light, a further increase in the temperature of the second amplifier fiber 30 leads to an increase in waste of energy of the heater of the temperature varying unit 36. Therefore, when the oscillation threshold pump power is somewhat higher than the desired power of the second pump light, it is preferable that the further increase in the temperature of the second amplifier fiber 30 be inhibited. In this case, a margin between the oscillation threshold pump power and the power of the second pump light at which the increase in the temperature is stopped may be appropriately set in consideration of response speed of the temperature varying unit 36, heat radiation speed of the second amplifier fiber 30, or the like.

As described above, according to the optical fiber amplifier 10 according to the first embodiment, the suppression of the oscillation of the ASE in the 1060 nm wavelength range can be accomplished by controlling the temperature of the second amplifier fiber 30. Incidentally, the ASE in the 1550 nm wavelength range as the wavelength range of the signal light is suppressed by the first isolator 16, the second isolator 24 and the third isolator 32. Thereby, the power of the second pump light outputted by the second pumping source 26 can be set high, and thus, the power of the output signal light can be increased.

(Second Embodiment)

FIG. 5 is a diagram showing an optical fiber amplifier 100 according to a second embodiment of the present invention. In the optical fiber amplifier 100 shown in FIG. 5, the same or corresponding structural components as or to those in the optical fiber amplifier 10 shown in FIG. 1 are indicated by the same reference numerals, and detailed description thereof will be omitted as appropriate.

The optical fiber amplifier 100 according to the second embodiment is different from the optical fiber amplifier 10 according to the first embodiment, in the configuration of the oscillation suppressor 42 of the second amplifier 14. In the second embodiment, the oscillation suppressor 42 includes the temperature varying unit 36, the temperature controller 38, the storage unit 40, a demultiplexer 44, and an ASE monitor unit 46.

Focusing attention on the fact that the ASE in the 1060 nm wavelength range has the temperature dependence as mentioned above, the optical fiber amplifier 100 according to the second embodiment detects the power of the ASE in the 1060 nm wavelength range from the output signal light, and controls the temperature of the second amplifier fiber 30 so that the detected power of the ASE is equal to or lower than the power of the ASE at the time of the oscillation (hereinafter referred to as oscillation threshold ASE power).

The demultiplexer 44 is provided at the output end of the second amplifier fiber 30, and demultiplexer the ASE in the 1060 nm wavelength range from the output signal light. In the embodiment, the demultiplexer 44 is provided in the following stage of the third isolator 32 but may be provided in the preceding stage of the third isolator 32. The ASE monitor unit receives the ASE in the 1060 nm wavelength range demultiplexed by the demultiplexer 44, and detects the power of the ASE.

The storage unit 40 of the second embodiment stores the oscillation threshold ASE power of the second amplifier fiber 30, and a relationship between the power of the ASE detected by the ASE monitor unit 46 and the temperature of the second amplifier fiber 30.

FIG. 6 is a graph showing a relationship between the oscillation threshold pump power and the power of the ASE. In FIG. 6, the vertical axis indicates the power detected by the ASE monitor unit 46, and the horizontal axis indicates the oscillation threshold pump power. In FIG. 6, there is shown the relationship at three types of temperatures: 100° C., 115° C., and 140° C. As shown in FIG. 6, as the temperature of the second amplifier fiber 30 rises, the oscillation threshold pump power increases. Meanwhile, the power of the ASE in the 1060 nm wavelength range is substantially constant (approximately 0 dBm). The storage unit 40 stores the substantially constant power of the ASE as the oscillation threshold ASE power.

FIG. 7 shows a relationship between the power of the ASE detected by the ASE monitor unit 46 and the temperature of the second amplifier fiber 30. In FIG. 7, the vertical axis indicates the power of the ASE detected by the ASE monitor unit 46, and the horizontal axis indicates the temperature of the second amplifier fiber 30. In FIG. 7, there is shown the relationship between the power of the ASE and the temperature of the second amplifier fiber 30, as observed when the power of the output signal light is 33 dBm. The storage unit 40 stores the relationship between the power of the ASE and the temperature of the second amplifier fiber 30 as shown in FIG. 7, for each power of the output signal light.

The temperature controller 38 acquires ASE power information from the ASE monitor unit 46, and controls the temperature of the second amplifier fiber 30 so that the power of the ASE detected by the ASE monitor unit 46 is equal to or lower than the oscillation threshold ASE power, by referring to the oscillation threshold ASE power (0 dBm in the embodiment) and the relationship between the power of the ASE and the temperature of the second amplifier fiber 30 stored in the storage unit 40. For example, when the power of the output signal light is 33 dBm, the temperature controller 38 controls the temperature varying unit 36 so that the temperature of the second amplifier fiber 30 is equal to or higher than about 112° C., by referring to the relationship shown in FIG. 7. Thereby, the power of the ASE becomes equal to or lower than 0 dBm as the oscillation threshold ASE power, and thus, the oscillation of the ASE in the 1060 nm wavelength range can be suppressed.

It is desirable that the oscillation threshold ASE power and the relationship between the power of the ASE detected by the ASE monitor unit 46 and the temperature of the second amplifier fiber 30 be measured in advance for each optical fiber amplifier 100. This allows the oscillation threshold ASE power and the relationship to be accurately set. Also, the oscillation threshold ASE power and the relationship depend on the fiber length of the second amplifier fiber 30 and thus may be estimated. In this case, the measurement process can be omitted, and thus, the manufacturing cost can be reduced.

In the embodiment, higher temperature of the second amplifier fiber 30 can yield lower power of the ASP in the 1060 nm wavelength range; however, when the power of the ASE is equal to or lower than the oscillation threshold ASE power, a further increase in the temperature of the second amplifier fiber 30 leads to an increase in waste of energy of the heater of the temperature varying unit 36. Therefore, when the power of the ASE is somewhat lower than the oscillation threshold ASE power, it is preferable that the further increase in the temperature of the second amplifier fiber 30 be inhibited. In this case, a margin between the oscillation threshold ASE power and the power of the ASE at which the increase in the temperature is stopped may be appropriately set in consideration of the response speed of the temperature varying unit 36, the heat radiation speed of the second amplifier fiber 30, or the like.

As described above, according to the optical fiber amplifier 100 according to the second embodiment, the suppression of the oscillation of the ASE in the 1060 nm wavelength range can be accomplished by detecting the power of the ASE in the 1060 nm wavelength range, and controlling the temperature of the second amplifier fiber 30 so that the detected power of the ASE is equal to or lower than the oscillation threshold ASE power. Thereby, the power of the second pump light outputted by the second pumping source 26 can be set high, and thus, the power of the output signal light can be increased.

The present invention has been described above based of the embodiments. It is to be understood by those skilled in the art that these embodiments are illustrative only and various modifications can be made by combining structural components or processes thereof, and that such modifications are included within the scope of the appended claims.

Although the double-clad fiber co-doped with Er and Yb is used as the amplifier optical fiber in the above-described embodiments, the amplifier optical fiber may be co-doped with any two selected from the group consisting of Er, Nd (neodymium), Ho (holmium), Tm (thulium), Pr (praseodymium), Yb and Eu (europium).

Also, the present invention is not limited to using the double-clad fiber as the amplifier optical fiber, and the optical fiber amplifier may use a single-cladding fiber and still the oscillation of the ASE in the different wavelength range from the signal wavelength range can be suppressed.

Explanation of Reference Numerals

10, 100 . . . optical fiber amplifier
12 . . . first amplifier
14 . . . second amplifier
16 . . . first isolator
18 . . . first pumping source
20 . . . multiplexer
22 . . . first amplifier fiber
24 . . . second isolator
26 . . . second pumping source
28 . . . pump combiner
30 . . . second amplifier fiber
32 . . . third isolator
34 . . . temperature detector

36 . . . temperature varying unit
38 . . . temperature controller
40 . . . storage unit
42 . . . oscillation suppressor
44 . . . demultiplexer
46 . . . ASE monitor unit

The invention claimed is:

1. An optical fiber amplifier comprising:

an amplifier optical fiber doped with a rare earth element;

a pumping source that supplies pump light to the amplifier optical fiber;

storage means for storing a relationship between oscillation threshold pump power and a temperature of the amplifier optical fiber, the oscillation threshold pump power being power of the pump light which causes oscillation of ASE in a different wavelength range from a signal wavelength range produced by the amplifier optical fiber; and temperature control means for controlling the temperature of the amplifier optical fiber so that the oscillation threshold pump power is higher than the power of the pump light outputted by the pumping source, by referring to the relationship stored in the storage means.

2. An optical fiber amplifier comprising:

an amplifier optical fiber doped with a rare earth element;

a pumping source that supplies pump light to the amplifier optical fiber;

detecting means for detecting power of ASE in a different wavelength range from a signal wavelength range produced by the amplifier optical fiber;

storage means for storing oscillation threshold ASE power and a relationship between the power of the ASE detected by the detecting means and temperature of the amplifier optical fiber, the oscillation threshold ASE power being the power of the ASE which causes oscillation of the ASE; and control means for controlling the temperature of the amplifier optical fiber so that the power of the ASE detected by the detecting means is equal to or lower than the oscillation threshold ASE power, by referring to the oscillation threshold ASE power and the relationship stored in the storage means.

3. The optical fiber amplifier according to claim 1 or 2, where in the amplifier optical fiber is co-doped with any two selected from the group consisting of Er, Nd, Ho, Tm, Pr, Yb and Eu.

4. The optical fiber amplifier according to claims 1 or 2, where in the amplifier optical fiber is a double-clad optical fiber.

* * * * *